(12) United States Patent
Steffan et al.

(10) Patent No.: US 8,391,727 B2
(45) Date of Patent: Mar. 5, 2013

(54) DETECTOR MODULE

(75) Inventors: Andreas Gerhard Steffan, Berlin (DE); Georgios Tsianos, Berlin (DE)

(73) Assignee: u2t Photonics AG, Berlin (DE)

( * ) Notice: Subject to any disclaimer, the term of this patent is extended or adjusted under 35 U.S.C. 154(b) by 565 days.

(21) Appl. No.: 12/654,419

(22) Filed: Dec. 18, 2009

(65) Prior Publication Data

US 2010/0158542 A1  Jun. 24, 2010

(30) Foreign Application Priority Data

Dec. 19, 2008 (DE) .......... 10 2008 063 838

(51) Int. Cl.
*H04B 10/06* (2006.01)
*G02B 6/42* (2006.01)
*G02B 6/26* (2006.01)

(52) U.S. Cl. .............. 398/212; 385/31; 385/38

(58) Field of Classification Search ............ 398/212
See application file for complete search history.

(56) References Cited

U.S. PATENT DOCUMENTS

| | | | |
|---|---|---|---|
| 6,985,281 B2 * | 1/2006 | Wagner et al. | 359/315 |
| 7,002,697 B2 * | 2/2006 | Domash et al. | 356/519 |
| 7,792,436 B2 * | 9/2010 | Hoshida et al. | 398/212 |
| 2002/0076157 A1 * | 6/2002 | Kropp | 385/38 |
| 2002/0131135 A1 * | 9/2002 | Chow et al. | 359/189 |
| 2003/0072009 A1 * | 4/2003 | Domash et al. | 356/519 |
| 2003/0151818 A1 * | 8/2003 | Wagner et al. | 359/578 |

FOREIGN PATENT DOCUMENTS

EP  1 172 674 A2  1/2002

OTHER PUBLICATIONS

Yuzo Ishii, et al., "SMT-Compatible Large-Tolerance 'OptoBump' Interface for Interchip Optical Interconnections", IEEE Transactions on Advanced Packaging, vol. 26, No. 2, May 2003 (pp. 122-127).*
G. G Unterb6rsch, et al., "Hybrid Flip-Chip Integration of a 40 Gb/s DPSK Receiver Comprising a Balanced Photodetector on a DU-SOI Board", ECOC 2008, Sep. 21-25, 2008, Brussels, Belgium; 978-1-4244-2~28-9; 2008 IEEE (vol. 5—pp. 59-60).*
G. Unterbörsch, et al., "Hybrid Flip-Chip Integration of a 40 Gb/s DPSK Receiver Comprising a Balanced Photodetector on a DLI-SOI Board", ECOC 2008, Sep. 21-25, 2008, Brussels, Belgium; 978-1-4244-2228-9; 2008 IEEE (vol. 5—pp. 59-60).

* cited by examiner

*Primary Examiner* — Kenneth N Vanderpuye
*Assistant Examiner* — Abbas H Alagheband
(74) *Attorney, Agent, or Firm* — Foley & Lardner LLP (57) ABSTRACT

A detector module for the reception of optical signals (SE) including a module housing having at least one electrical and at least one optical bushing, at least one electrical assembly connected to the electrical bushing, and at least one optical assembly connected to the optical bushing, the electrical and optical assemblies being arranged within the module housing, the optical and electrical assemblies being connected to one another via at least one optical interface, and the electrical assembly having at least one photodiode for converting the optical output signals of the optical assembly into electrical signals. The optical assembly has at least one collimator and on the output side transmits at least one beam comprising collimated electromagnetic rays running parallel to one another via a free-radiating connection as optical interface to the electrical assembly, and the electrical assembly receives the beam from the optical assembly via the free-radiating connection.

15 Claims, 7 Drawing Sheets

DETECTOR MODULE

The application relates to a detector module for the reception of optical signals.

BACKGROUND

As is known, detector modules of this type have a module housing having at least one electrical and at least one optical bushing, at least one electrical assembly connected to the electrical bushing, and at least one optical assembly connected to the optical bushing, the electrical and optical assemblies being arranged within the module housing, the optical and electrical assemblies being connected to one another via at least one optical interface, and the electrical assembly having at least one photodiode for converting the optical output signals of the optical assembly into electrical signals.

During the transmission of high-bit-rate data signals by means of higher-order modulation formats such as, e.g. D(Q)PSK, (DP)QPSK, n-QAM etc., the information coded in the amplitude and phase of the optical signal is converted into pure optical amplitude signals by means of an optical assembly, which are then converted into electrical signals by the electrical assembly and the photodiodes contained therein. One important point in the development and production of small and cost-effective components such as counterparts of DSL modems in the switching center (so-called "linecards") and transponders, for example, is the integration of the different functionalities in one housing. What is critical here primarily is that predefined housing heights must not be exceeded and the electrical radio-frequency bushings must have predefined heights that are predefined by other modules—such as an electrical demultiplexer for example—disposed downstream of the detector module. The maximum housing height corresponds to 8.5 mm, for example, for standard linecards and to 6.5 mm, for example, for small form factor (SFF) transponders. The predefined height for the electrical radio frequency bushings is 3.32 mm, for example, and is determined by the height of the radio frequency inputs of an electrical demultiplexer that has become established commercially (see e.g. Sierra Monolithics SMI4034 and SMI4036).

SUMMARY

Proceeding from the requirements described, at least one of the embodiments described here is based on the object of specifying a detector module which can be manufactured particularly simply and with which the predefined dimensions described can at the same time be complied with.

Accordingly, a detector module includes an optical assembly having at least one collimator and on the output side transmits at least one beam comprising collimated electromagnetic rays running parallel to one another via a free-radiating connection as optical interface to the electrical assembly, and the electrical assembly receives the beam from the optical assembly via the free-radiating connection.

One essential advantage of the detector module can be seen in the fact that no fiber-optic connection is required between the optical and electrical assemblies, as a result of which the overall space requirement is drastically reduced.

A further essential advantage of the detector module is that, on account of the free-radiating connection, the electrical and optical assemblies can be constructed separately or in separated fashion before they are inserted into the module housing; the two assemblies are subsequently connected contactlessly by means of the free-radiating connection. Separate complete construction of the two assemblies makes it possible to ensure a particularly high internal stability and integrity of each individual assembly. Stability and integrity are advantageous particularly in the case of optical assembles which are designed as delay line interferometers and utilize the interference of two different beam paths. However, a separate construction has many advantages for the electrical assembly, too, since the electrical components only have to be oriented relative to the electrical bushing, without the need here to take account of the alignment relative to the optical assembly disposed upstream; this is because the optical assembly is preferably not incorporated into the module housing until after the electrical assembly and is aligned relative to the electrical assembly by means of the free-radiating connection.

A further essential advantage of the detector module is that, on account of the free-radiating connection, external influences such as temperature changes or mechanical stresses as a result of the mounting of the housing, for example, have no appreciable influence on the coupling efficiency between the two assemblies and hence the overall performance of the detector module.

With regard to the possibility of also being able to receive high-bit-rate data signals by means of higher-order modulation formats such as e.g. D(Q)PSK, (DP)QPSK, n-QAM etc., it is regarded as advantageous if the optical assembly has an optical demodulation device, which converts a phase-modulated optical signal present on the input side into at least one signal pair comprising two amplitude-modulated optical signals that are orthogonal to one another, and the optical assembly transmits the at least two orthogonal amplitude-modulated optical signals by means of a respective separate beam to the electrical assembly.

In order to avoid the need for optical alignment at the input side of the optical assembly, it is regarded as advantageous if the collimator is connected on the input side to an optical waveguide that is led through the optical bushing. By way of example, the collimator and the optical waveguide form a so-called collimator-pigtail (collimator with fiber end).

For the further processing of the received signal it is regarded as advantageous if the electrical assembly contains an amplifier disposed downstream of the photodiode.

The photodiodes can be formed for example by individual separate photodiodes or photodiode arrays and the assigned amplifiers can be formed for example by individual separate amplifiers or by amplifier arrays.

Preferably, the electrical assembly has at least one conductor track carrier comprising wholly or partly RF optimized conductor tracks, the electrical connections for the photodiode being situated on the top side of the conductor track carrier.

The electrical assembly can for example be mounted completely or in parts on the inner side of the module housing and be connected to the electrical bushing.

Preferably, at least one, preferably all, of the components forming the electrical assembly are configured in such a way that the assembly only has to be aligned relative to the electrical bushing upon insertion into the module housing.

The optical assembly can have a carrier substrate, for example, at or on which the remaining components of the optical assembly are mounted. Preferably, the optical assembly is equipped with at least one mechanical, electrical, electrothermal and/or electromechanical actuator.

The electrical and optical assemblies can be oriented with respect to one another for example in such a way that the top sides of the assemblies point in the same direction. As an alternative, the top sides of the assemblies can also point in opposite directions.

In order to establish or contribute to a height compensation between the height level of the optical free-radiating connection and the electrical bushing of the module housing, the electrical assembly can have for example at least one conductor track carrier which is tilted with respect to the plane of the module housing base.

The components of the electrical assembly can, moreover, be arranged in height-gradated fashion in such a way as to establish or contribute to a height compensation between the height level of the optical free-radiating connection of the electrical assembly and the electrical bushing of the module housing.

In addition, the electrical assembly can have at least one lens which focuses a beam received from the optical assembly on the photodiode.

Preferably, between the electrical assembly and the optical assembly there are at least two parallel free-radiating connections with a respective beam, the electrical assembly having a one-piece lens array comprising at least two lenses for focusing the beams onto assigned photodiodes.

BRIEF DESCRIPTION OF THE FIGURES

The detector module is explained in more detail below on the basis of exemplary embodiments: in the figures by way of example.

In the figures, the same reference symbols are always used for identical or comparable components, for the sake of clarity.

DESCRIPTION

Figure 1:
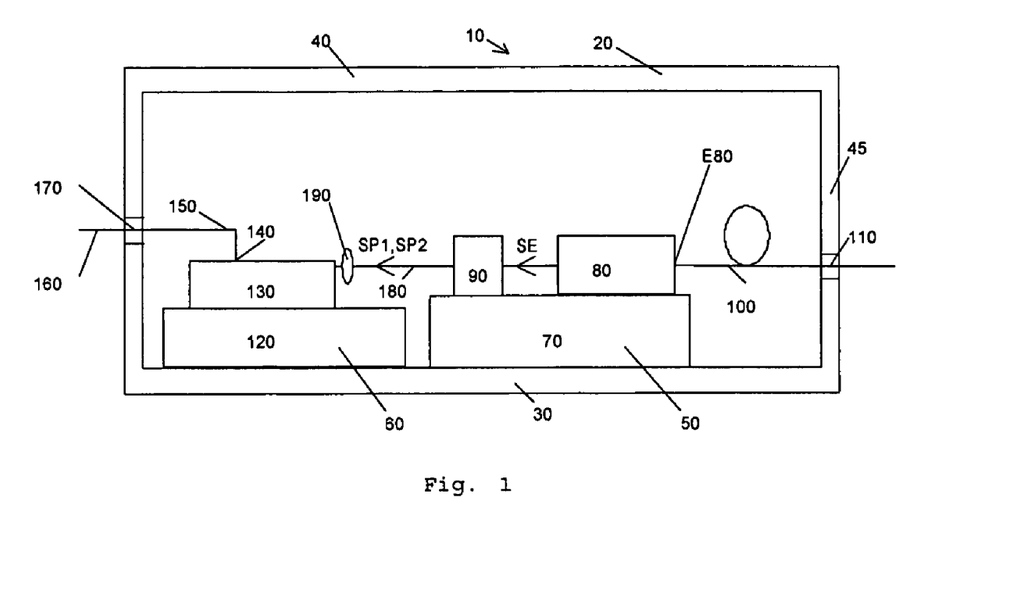
FIG. 1 shows a first exemplary embodiment of a detector module, in which an optical assembly has an optical demodulation device and generates two beams on the output side.

FIG. 1 illustrates an exemplary embodiment of a detector module 10. The detector module has a module housing 20 having a baseplate 30, a cover 40 and side walls 45. An optical assembly 50 and also an electrical assembly 60 are arranged on the baseplate 30 of the module housing 20.

The optical assembly 50 comprises a carrier 70, on which a collimator 80 and also a demodulation device 90 are arranged. One end of an optical waveguide 100, which can be an optical fiber made of glass, for example, is connected to the input E80 of the collimator 80. The other end of the optical waveguide 100 is led toward the outside through an optical bushing 110 in the side wall 45 of the module housing 20.

The electrical assembly 60 comprises a carrier 120, on which at least one photodiode array 130 having two photodiodes, for example, is arranged. One end 140 of an electrical line 150 is connected to the photodiode array 130, the other end 160 of said electrical line being led toward the outside through an electrical bushing 170 in the module housing 20. Instead of a single line, it is also possible for there to be a plurality of electrical lines present, which are led out of the module housing through one or a plurality of electrical bushings.

The electrical assembly 60 and the optical assembly 50 are optically coupled to one another via a free-radiating connection 180. In order to achieve the effect here that the electromagnetic rays generated by the optical assembly 50 are coupled into the photodiode array 130 as efficiently as possible, the electrical assembly 60 can have for example at least one lens array 190 which focuses each beam generated by the optical assembly 50; by way of example, each light beam is assigned to a respective photodiode of the photodiode array 130.

In the exemplary embodiment in accordance with FIG. 1, the demodulation device 90 is configured for example in such a way that it generates, with a phase-modulated optical signal SE present on the input side, at least one signal pair having two amplitude-modulated optical signals SP1 and SP2 that are orthogonal to one another. The two amplitude-modulated optical signals SP1 and SP2 that are orthogonal to one another are transmitted in each case by means of a separate beam via the free-radiating connection 180 to the electrical assembly 60. The photodiode array 130 converts the incident beams into electrical signals which, via the at least one electrical line 150, are led out of the module housing 20 through the electrical bushing 170.

Figure 2:
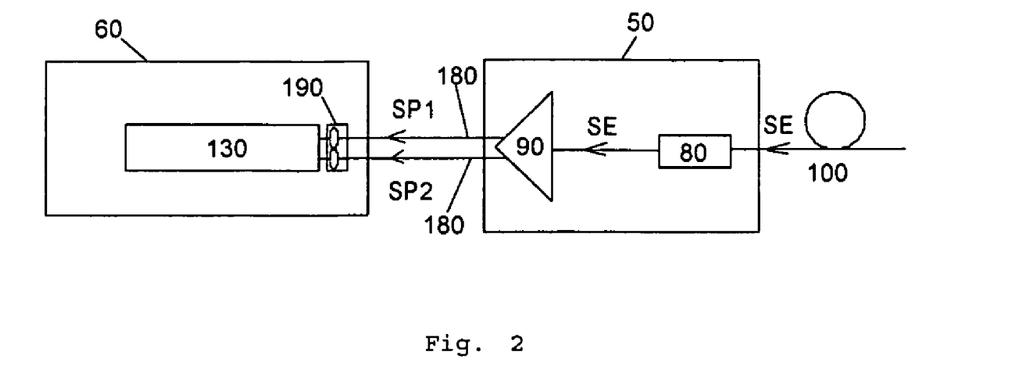
FIG. 2 shows the detector module in accordance with FIG. 1 in an plan view.

FIG. 2 shows the construction of the electrical assembly 60 and of the optical assembly 50 in accordance with FIG. 1 again, in plan view. It can be discerned that the two amplitude-modulated optical signals SP1 and SP2 that are orthogonal to one another are transmitted by means of a respective dedicated beam, that is to say respectively via a dedicated free-radiating connection 180 and are focused on the photodiode array 130 by the lens array 190. The module housing of the detector module and also the electrical and optical bushings are not illustrated in FIG. 2, for the sake of clarity.

Figure 3:
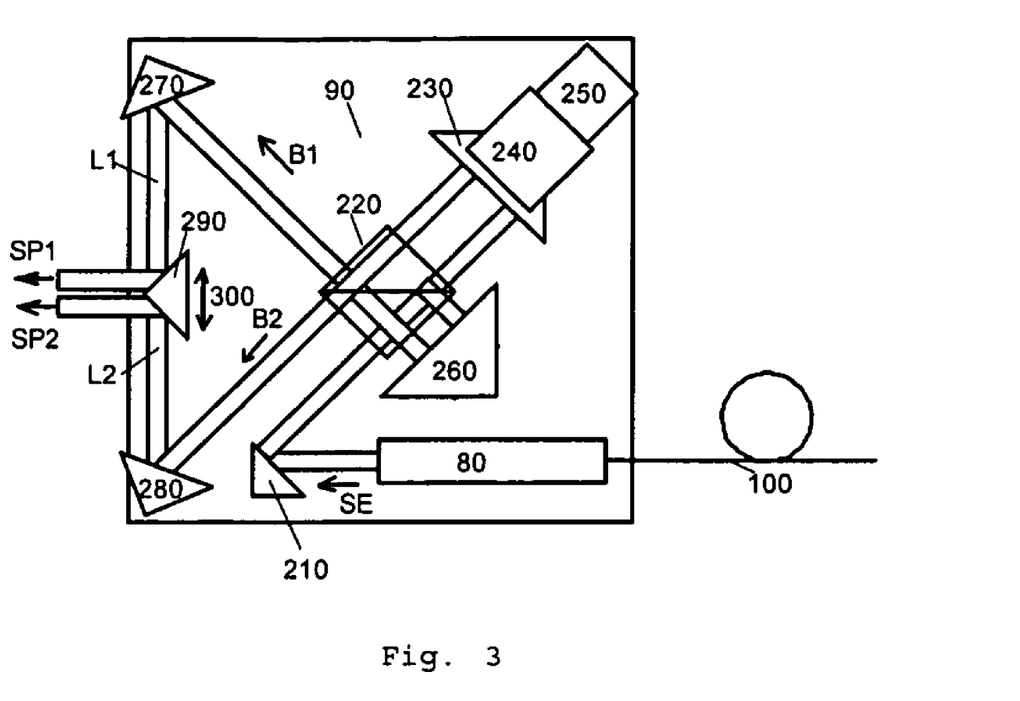
FIG. 3 shows an exemplary embodiment of the internal construction of the demodulation device of the detector module in accordance with FIGS. 1 and 2.

FIG. 3 shows an exemplary embodiment of the construction of the demodulation device 90 in accordance with FIGS. 1 and 2. On the input side, the demodulation device 90 has a deflection mirror 210, which directs the phase-modulated optical signal SE coming from the collimator 80 in the direction of a beam splitter 220. One collimated beam component passes to a retro-reflector element 230, which can be set by a heating element 240 and a piezoelement 250, and from there back to the beam splitter 220. The other collimated beam component passes to a mirror 260 and is directed from the latter back to the beam splitter 220. With the returning collimated beam components, the beam splitter 220 forms two collimated output beams B1 and B2 and directs them in the direction of two mirrors 270 and 280, which direct the output beams B1 and B2 in the direction of a mirror 290 embodied as a "nose". By displacing the nose along the arrow direction 300, it is possible to set the path difference between the optical paths L1 and L2, for example to zero. The two amplitude-modulated optical signals SP1 and SP2 that are orthogonal to one another are output at the output of the nose 290.

The distance between the two optical signals SP1 and SP2 can be set very precisely, for example to a value of 250 μm; preferably, the distance between the signals is set such that it corresponds to the distance between the lenses of the lens array 190 in accordance with FIG. 2.

Figure 4:
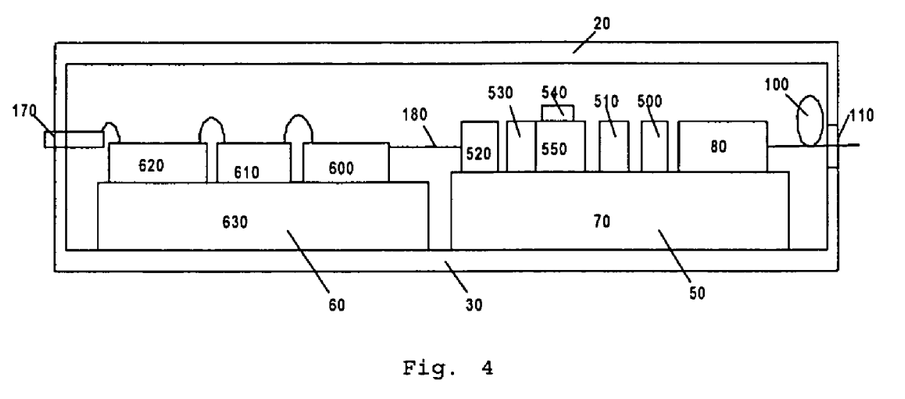
FIG. 4 shows a second exemplary embodiment of a detector module, in which the electrical assembly has at least one photodiode, at least one amplifier and at least one conductor track carrier, the conductor track carrier, the amplifier and the photodiode being arranged on a planar carrier plate.

FIG. 4 illustrates a second exemplary embodiment of a detector module. It can be discerned that a collimator 80, a beam splitter 500, two mirrors 510 and 520, a piezoelement 530, a heating element 540 and also a retro-reflector element 550 are arranged on the carrier 70 of the optical assembly 50. The beam splitter 500, the two mirrors 510 and 520, the piezoelement 530, the heating element 540 and also the retro-reflector element 550 form the demodulation device of the optical assembly 50.

It can additionally be discerned in FIG. 4 that the electrical component 60 comprises at least one photodiode 600, at least one amplifier 610 and at least one conductor track carrier 620. The three elements, that is to say the photodiode 600, the amplifier 610 and also the conductor track carrier 620, are arranged on a planar carrier plate 630 of the electrical components 60. Such a planar carrier plate 630 is advantageous particularly when the height of the free-radiating connection 180, that is to say the distance of the free-radiating connection 180 from the baseplate 30 of the module housing 20, corresponds approximately to the height of the electrical bushing 170, with the result that there is no need to effect any height adaptation between the electrical bushing 170 and the free-radiating connection 180.

Figure 5:
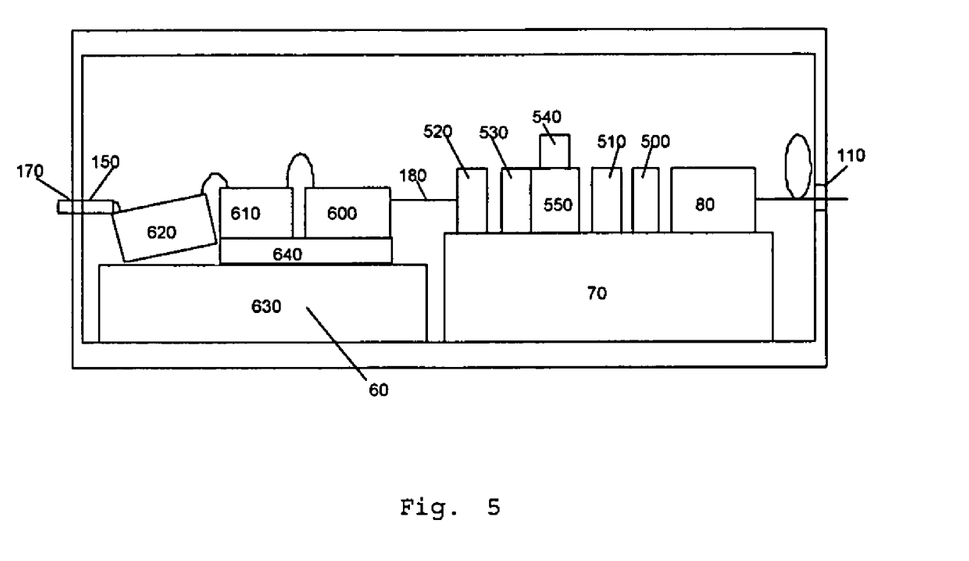
FIG. 5 shows a third exemplary embodiment of a detector module, in which a structural height adaptation is effected by means of an intermediate element in the electrical assembly and the conductor track carrier is arranged in tilted fashion.

FIG. 5 shows a third exemplary embodiment of a detector module. In this exemplary embodiment, an intermediate element 640 is arranged on the planar carrier plate 630 of the electrical assembly 60, said intermediate element bringing about a height adaptation in order that the optical free-radiating connection 180 between the mirror 520 and the photodiode 600 is made possible. In order that a simple electrical connection between the amplifier 610 and the photodiode 600 is made possible, the amplifier 610 is also arranged on the intermediate element 640.

A height difference between the amplifier 610 and the electrical bushing 170 arises, however, as a result of the intermediate element 640; in the exemplary embodiment in accordance with FIG. 5, said height difference is compensated for by the fact that the conductor track carrier 620 is mounted in tilted fashion. This makes it possible for the amplifier 610, which is arranged too high relative to the height of the electrical bushing 170, nevertheless to be connected without any problems to the electrical line 150 that is led through the bushing 170.

Figure 6:
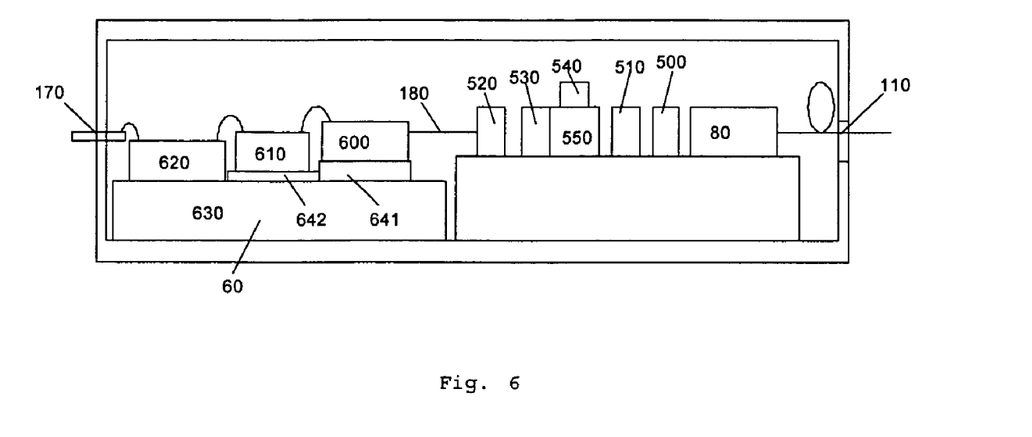
FIG. 6 shows a fourth exemplary embodiment of a detector module, in which intermediate elements having different heights bring about a structural height adaptation within the electrical assembly.

FIG. 6 shows a fourth exemplary embodiment of a detector module. Two intermediate elements 641 and 642 having different thicknesses or different heights are present in this exemplary embodiment. The intermediate element 641 serves for mounting the photodiode 600 on the planar carrier plate 630. The intermediate element 642 secures the amplifier 610 on the carrier plate 630.

By virtue of the fact that the two intermediate elements 641 and 642 are dimensioned with different heights or different thicknesses, a height adaptation between conductor track carrier 620, amplifier 610 and photodiode 600 and additionally, if appropriate, a height difference between the electrical bushing 170 and the free-radiation connection 180 can be compensated for.

Figure 7:
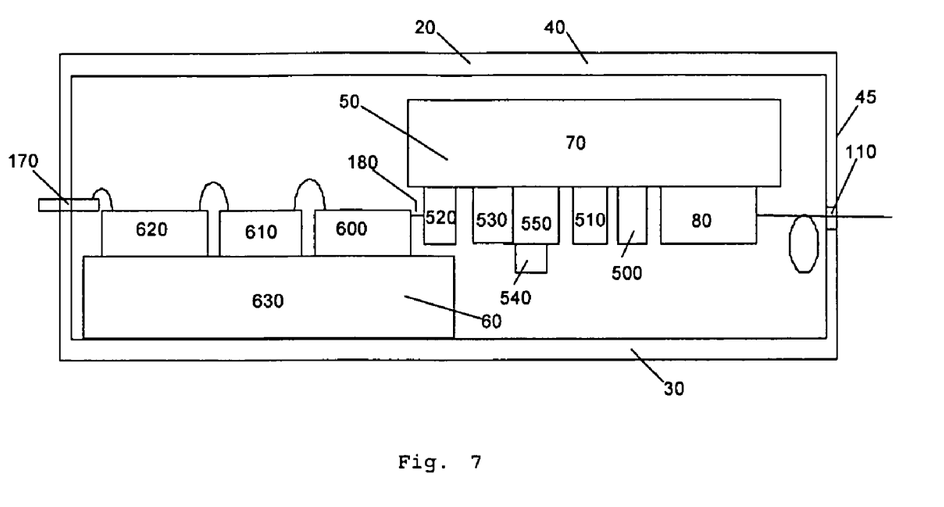
FIG. 7 shows a fifth exemplary embodiment of a detector module, in which the optical assembly is mounted upside down—relative to the electrical assembly—in the module housing.

FIG. 7 shows a fifth exemplary embodiment of a detector module. In this exemplary embodiment, the electrical assembly 60 and the optical assembly 50 are arranged upside down relative to one another. Thus, in the exemplary embodiment in accordance with FIG. 7, the electrical assembly 60 is arranged with its carrier plate 630 on the baseplate 30 of the module housing 20. The optical assembly 50 is mounted upside down, although a free-radiating connection 180 between the mirror 520 and the photodiode 600 remains ensured The securing of the optical assembly 50 within the module housing 20 is in any desired manner in this case. Thus, the carrier 70 of the optical assembly 50 can be secured to the cover 40 of the module housing 20, to the side wall 45 of the module housing 20 or with the aid of additional securing elements (not illustrated in further detail in FIG. 7) on the baseplate 30 of the module housing 20.

German Priority Application 10 2008 063 838.2, filed Dec. 19, 2008 including the specification, drawings, claims and abstract, is incorporated herein by reference in its entirety.

What is claimed is:

1. A detector module for the reception of optical signals comprising:
    a module housing having an electrical bushing and an optical bushing;
    an electrical assembly connected to the electrical bushing; and
    an optical assembly connected to the optical bushing,
    wherein the electrical and optical assemblies are arranged within the module housing, the optical and electrical assemblies being connected to one another via at least one optical interface,
    wherein the electrical assembly has a photodiode for converting optical output signals of the optical assembly into electrical signals,
    wherein the optical assembly has a collimator and on an output side transmits a beam comprising collimated electromagnetic rays running parallel to one another via a free-radiating connection as optical interface to the electrical assembly,
    wherein the electrical assembly receives the beam from the optical assembly via the free-radiating connection,
    wherein the optical assembly has an optical demodulation device, which converts a phase-modulated optical signal present on an input side into at least one signal pair comprising two amplitude-modulated optical signals that are orthogonal to one another, and
    wherein the optical assembly transmits the two orthogonal amplitude-modulated optical signals by a respective separate beam to the electrical assembly.

2. The detector module as claimed in claim 1, wherein the collimator is connected on the input side to an optical waveguide that is led through the optical bushing.

3. The detector module as claimed in claim 1, wherein the electrical assembly contains an amplifier assigned to the photodiode.

4. The detector module as claimed in claim 1, wherein the photodiode comprises photodiodes formed by individual separate photodiodes or photodiode arrays and amplifiers assigned to the photodiodes are formed by individual separate amplifiers or by amplifier arrays.

5. The detector module as claimed in claim 1, wherein the electrical assembly has a conductor track carrier comprising wholly or partly RF optimized conductor tracks, electrical connections for the photodiode being situated on the top side of the conductor track carrier.

6. The detector module as claimed in claim 1, wherein the electrical assembly is mounted completely or in parts on an inner side of the module housing and connected to the electrical bushing.

7. The detector module as claimed in claim 1, wherein at least one of the components forming the electrical assembly are configured in such a way that the electrical assembly only has to be aligned relative to the electrical bushing upon insertion into the module housing.

8. The detector module as claimed in claim 1, wherein the optical assembly has a carrier, at or on which remaining components of the optical assembly are mounted.

9. The detector module as claimed in claim 1, wherein the optical assembly has at least one mechanical, electrical, electrothermal and/or electromechanical actuator.

10. The detector module as claimed in claim 1, wherein the electrical and optical assemblies are oriented with respect to one another in such a way that top sides of the electrical and optical assemblies point in the same direction.

11. A detector module for the reception of optical signals comprising:
   a module housing having an electrical bushing and an optical bushing;
   an electrical assembly connected to the electrical bushing; and
   an optical assembly connected to the optical bushing,
   wherein the electrical and optical assemblies are arranged within the module housing, the optical and electrical assemblies being connected to one another via at least one optical interface,
   wherein the electrical assembly has a photodiode for converting optical output signals of the optical assembly into electrical signals,
   wherein the optical assembly has a collimator and on an output side transmits a beam comprising collimated electromagnetic rays running parallel to one another via a free-radiating connection as optical interface to the electrical assembly,
   wherein the electrical assembly receives the beam from the optical assembly via the free-radiating connection, and
   wherein the electrical assembly has at least one conductor track carrier which is tilted with respect to a plane of a module housing base in such a way that it establishes or contributes to a height compensation between a height level of the free-radiating connection of the electrical assembly and the electrical bushing of the module housing.

12. The detector module as claimed in claim 1, wherein the components of the electrical assembly are arranged in height-gradated fashion in such a way as to establish or contribute to a height compensation between height level of the free-radiating connection of the electrical assembly and the electrical bushing of the module housing.

13. The detector module as claimed in claim 1, wherein the electrical and optical assemblies are oriented with respect to one another in such a way that top sides of the electrical and optical assemblies point in opposite directions.

14. The detector module as claimed in claim 11, wherein the electrical assembly has at least one lens which focuses a beam received from the optical assembly on the photodiode.

15. A detector module for the reception of optical signals comprising:
   a module housing having an electrical bushing and an optical bushing,
   an electrical assembly connected to the electrical bushing; and
   an optical assembly connected to the optical bushing,
   wherein the electrical and optical assemblies are arranged within the module housing, the optical and electrical assemblies being connected to one another via at least one optical interface,
   wherein the electrical assembly has a photodiode for converting optical output signals of the optical assembly into electrical signals,
   wherein the optical assembly has a collimator and on an output side transmits a beam comprising collimated electromagnetic rays running parallel to one another via a free-radiating connection as optical interface to the electrical assembly,
   wherein the electrical assembly receives the beam from the optical assembly via the free-radiating connection, and
   wherein between the electrical assembly and the optical assembly there are at least two parallel free-radiating connections with a respective beam, the electrical assembly having a one-piece lens array including at least two lenses for focusing the beams onto assigned photodiodes.

* * * * *